United States Patent
Beck et al.

(10) Patent No.: US 7,388,608 B2
(45) Date of Patent: Jun. 17, 2008

(54) SAMPLE AND HOLD CIRCUIT AND ACTIVE PIXEL SENSOR ARRAY SAMPLING SYSTEM UTILIZING SAME

(75) Inventors: Jeffery Steven Beck, Corvallis, OR (US); Matthew Michael Borg, Albany, OR (US)

(73) Assignee: Micron Technology, Inc., Boise, ID (US)

( * ) Notice: Subject to any disclaimer, the term of this patent is extended or adjusted under 35 U.S.C. 154(b) by 708 days.

(21) Appl. No.: 10/798,979

(22) Filed: Mar. 11, 2004

(65) Prior Publication Data

US 2005/0200731 A1    Sep. 15, 2005

(51) Int. Cl.
*H04N 9/64* (2006.01)
*H04N 3/14* (2006.01)
(52) U.S. Cl. .................. 348/243; 348/294; 348/241
(58) Field of Classification Search ............. 348/243, 348/301, 300, 307, 298
See application file for complete search history.

(56) References Cited

U.S. PATENT DOCUMENTS

| 4,786,831 | A  | * | 11/1988 | Morse et al. ............... 327/566 |
| 6,365,950 | B1 | * | 4/2002  | Sohn ........................ 257/431 |
| 6,423,961 | B1 | * | 7/2002  | Niederkorn et al. .. 250/214 LA |
| 6,476,864 | B1 | * | 11/2002 | Borg et al. ................ 348/241 |
| 6,567,028 | B2 | * | 5/2003  | Huang et al. ............... 341/155 |
| 7,113,215 | B2 | * | 9/2006  | Kokubun ................... 348/308 |
| 2004/0036783 | A1 | * | 2/2004 | Barna ........................ 348/300 |

* cited by examiner

*Primary Examiner*—David Ometz
*Assistant Examiner*—Luong T. Nguyen
(74) *Attorney, Agent, or Firm*—RatnerPrestia

(57) ABSTRACT

An active pixel sensor array sampling system includes a plurality of video circuits and reset circuits. A video circuit generates a video voltage from each one of the pixels of a column of pixels. An associated reset circuit generates a reset voltage for each of the pixels of a column of pixels. The video circuits and the reset circuits are closed loop sample and hold circuits. The active pixel sensor array is integrated on an integrated circuit.

21 Claims, 3 Drawing Sheets

SAMPLE AND HOLD CIRCUIT AND ACTIVE PIXEL SENSOR ARRAY SAMPLING SYSTEM UTILIZING SAME

BACKGROUND OF THE INVENTION

Active pixel sensor arrays, such as may be employed to advantage in CMOS imaging arrays, are well known in the art. In such arrays, active pixels, usually arrayed in columns and rows, generate an output voltage having a magnitude related to the intensity of light of an image impending on the pixels. The output magnitudes are then quantized to permit digital storage and/or display of the image.

Sampling circuits are generally utilized for reading the pixel voltage of each pixel. To that end, the pixel voltage of each pixel is sampled and held by a corresponding respective column sample and hold circuit. The pixel voltage of all pixels in a row of pixels are sampled in parallel.

Following sampling of the row of pixels, a reset voltage associated with each pixel is also sampled. Hence, associated with each pixel voltage sample and hold circuit is a reset voltage sample and hold circuit. The need for such reset voltages is well known in the art. The reset voltages for all pixels in a row of pixels are also sampled and held in parallel following the pixel voltage sampling.

With each pixel and reset voltage sampled and held for each pixel in a row of pixels, the pixel voltage and reset voltages for each pixel are then read together for storage or display. The pixel and reset voltage for each pixel when read may be inputted to a differential amplifier which subtracts the pixel voltage from the reset voltage to provide a differential voltage which is then quantized for storage and display. The pixel and reset voltages of the pixels are read in series, one pixel at a time, until all of the pixel and reset voltages of a row of pixels are read. Then, the next row of pixels are addressed and the above process is repeated.

The need for accurate and reliable pixel voltage and reset voltage reading is critical to a quality image reproduction. Any sampling errors, especially those of a repetitive nature, can result in, for example, column wise noise and unwanted horizontal stripes in the final image. Such image imperfections may be readily perceptible by the human eye.

Prior sampling circuits have utilized differential source-follower-type buffers for sampling and holding pixel and reset voltages. These circuits suffer from sources of error such as source-follower transistor mismatch, current source mismatch, sampling error mismatch, and signal dependent charge injection. All of these errors can be coherent in nature and result in perceptible column-wise error. The present invention is therefore generally directed to a sample and hold circuit which may be employed to advantage in active pixel sampling array systems which avoid the coherent errors mentioned above.

SUMMARY OF THE INVENTION

In accordance with one aspect of the present invention, an active pixel sensor array sampling system comprises at least one video circuit that generates a video voltage from each one of a group of pixels and at least one reset circuit that generates a reset voltage associated with each one of the pixels in the group of pixels. One of the at least one video circuit and at least one reset circuit comprises a closed loop sample and hold circuit.

The closed loop sample and hold circuit may comprise, for example, a single ended common source amplifier. The amplifier may include a capacitor for holding one of the video voltages and the reset voltages. The sample and hold circuit may further include an amplifier having an input and an output and switches that place its capacitor across its input and output.

The pixels of the system are preferably arranged in columns and rows. The at least one video circuit preferably comprises a plurality of video amplifiers, each video amplifier being associated with a respective column of pixels. The at least one reset circuit preferably comprises a plurality of reset amplifiers, each reset amplifier being associated with one of the video amplifiers.

In accordance with a further embodiment of the invention, an active pixel sensor array sampling system comprises a video circuit that generates a video voltage for each one of a group of pixels and a reset circuit associated with a video circuit that generates a reset voltage associated with each of the pixels in the group of pixels. The video circuit and the reset circuit each comprise a closed loop sample and hold circuit.

In a further embodiment, the present invention provides a video amplifier. The video amplifier may be utilized to advantage for sampling an active pixel sensor array. The video amplifier preferably comprises a closed loop sample and hold circuit.

According to a further embodiment of the invention, an integrated circuit includes a video amplifier for use in sampling an active pixel sensor array. The video amplifier of the integrated circuit comprises a closed loop sample and hold circuit.

BRIEF DESCRIPTION OF THE DRAWINGS

The foregoing aspects and many of the attended advantages of this invention will become more readily appreciated as the same become better understood by reference to the following detailed description, when taken in conjunction with the accompanying drawings, wherein.

DESCRIPTION OF THE INVENTION

The following discussion is presented to enable a person skilled in the art to make and use the invention. The general principals described herein may be applied to embodiments and applications other than those detailed below without departing from the spirit and scope of the present invention. The present invention is not intended to be limited to the embodiments shown, but is to be accorded the widest scope consistent with the principals and features disclosed or suggested herein.

Figure 1:
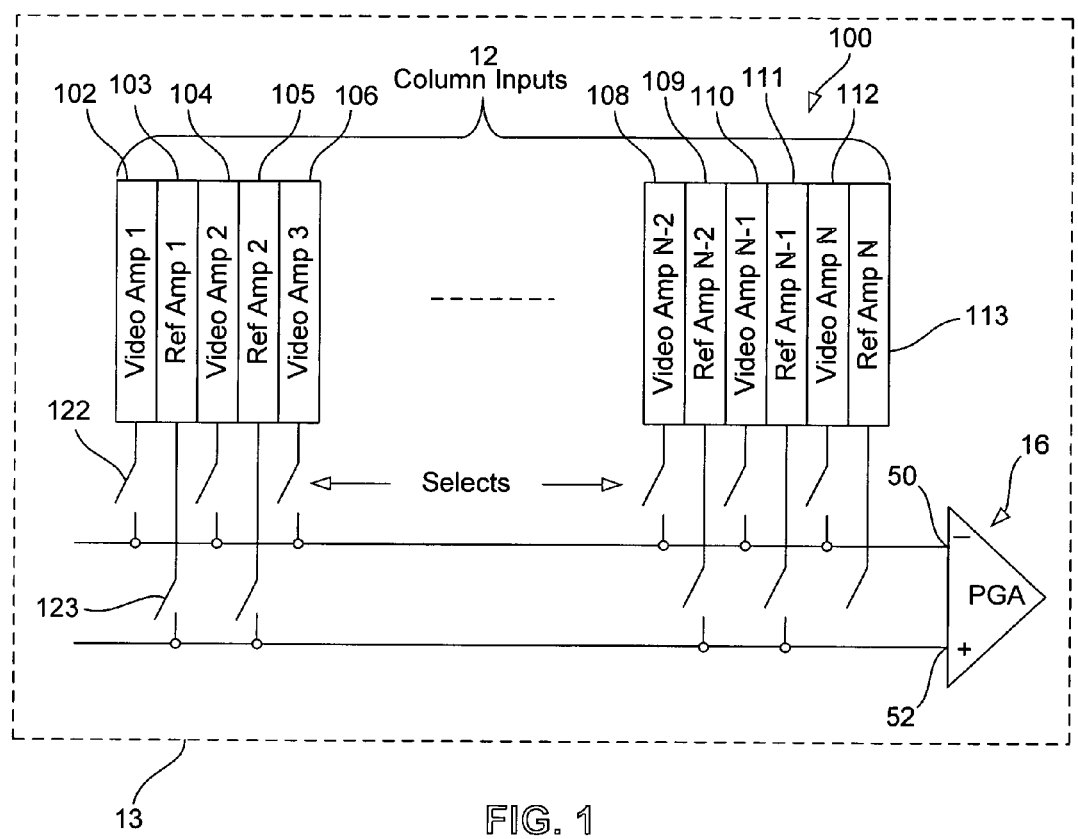
FIG. 1 is a block diagram of an active pixel sensor array sampling system embodying the present invention.

Referring now to FIG. 1, it illustrates an active pixel sensor array sampling system 100 embodying the present invention. The system 100 is formed in an integrated circuit 13, such as a CMOS integrated circuit. The system 100 includes a differential amplifier 16 which provides a differential voltage for each pixel representing the difference between the pixel voltage and the pixels associated reset voltage. The video circuit further includes a plurality of video amplifiers 102, 104, 106, 108, 110, and 112. Each of the video amplifiers is associated with one of the columns of pixels. The reset circuit includes a plurality of reset amplifiers 103, 105, 107, 109, 111, and 113. Each of the reset amplifiers is associated with one of the column video amplifiers. Hence, each column of pixels has associated with it a video amplifier and a reset amplifier.

The video and reference amplifiers of FIG. 1 are coupled to the differential amplifier 16 through a switch associated with each amplifier. To that end, video amplifier 102 is selectively coupled to input 50 of the differential amplifier 16 by a switch 122. Similarly, reset amplifier 103 is coupled to the input 52 of the differential amplifier 16 by its associated switch 123. Similarly, each pair of video and reset amplifiers includes a pair of switches. The switches of each pair of video and reset amplifier switches open and close together. The switch pairs close when a pixel and reset voltage of its associated pixel is read and transferred to the differential amplifier 16.

Figure 2:
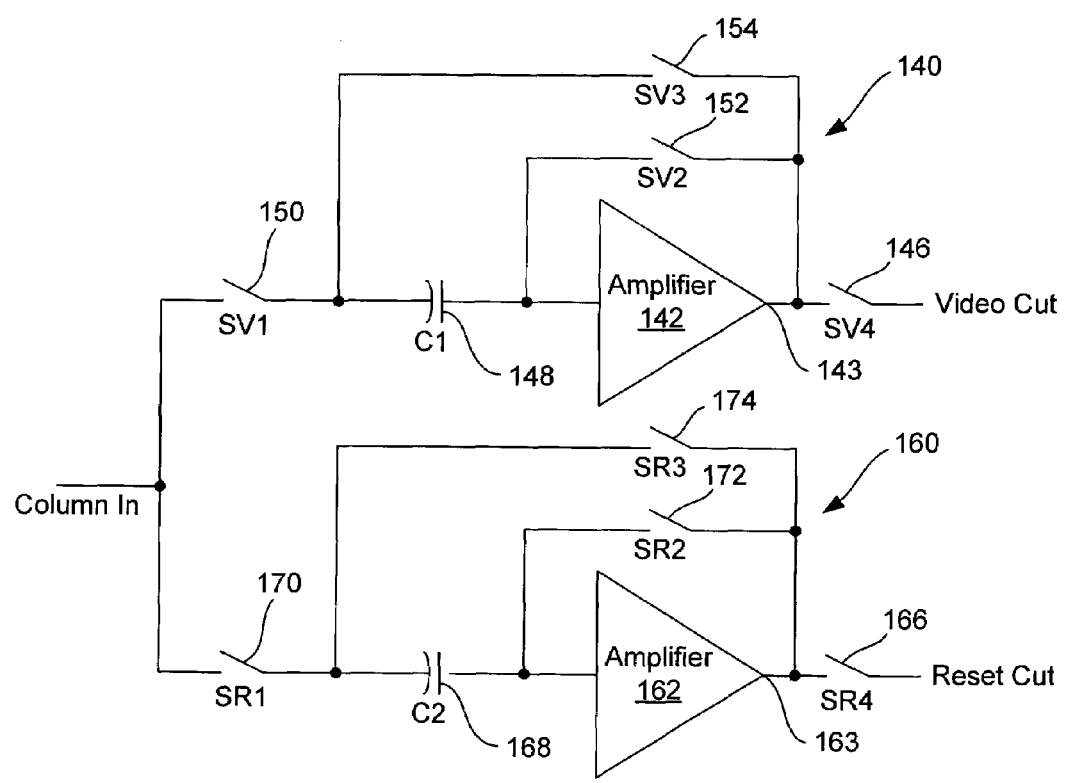
FIG. 2 is a schematic circuit diagram of a video and reset amplifier pair which may be used to advantage in the system of FIG. 1 and which embodies the present invention.

FIG. 2 shows a circuit diagram of a video amplifier and reset amplifier pair which may be utilized in an active pixel array sampling system embodying the present invention. The video amplifier 140 of the amplifier pair includes an amplifier 142, switch 146, capacitor 148, and switches 150, 152, and 154.

The reference amplifier 160 includes an amplifier 162, a switch 166, a capacitor 168, and switches 170, 172, and 174. The video amplifier circuit 140 and reference amplifier 160 operate in the same manner. As will be seen hereinafter, each of the amplifiers 142 and 162 is a single ended common source amplifier. The switches 146 and 166 couple the video and reset amplifiers to the differential amplifier when a pixel and reset voltage of a pixel associated with the circuits 140 and 160 are read.

Figure 3:
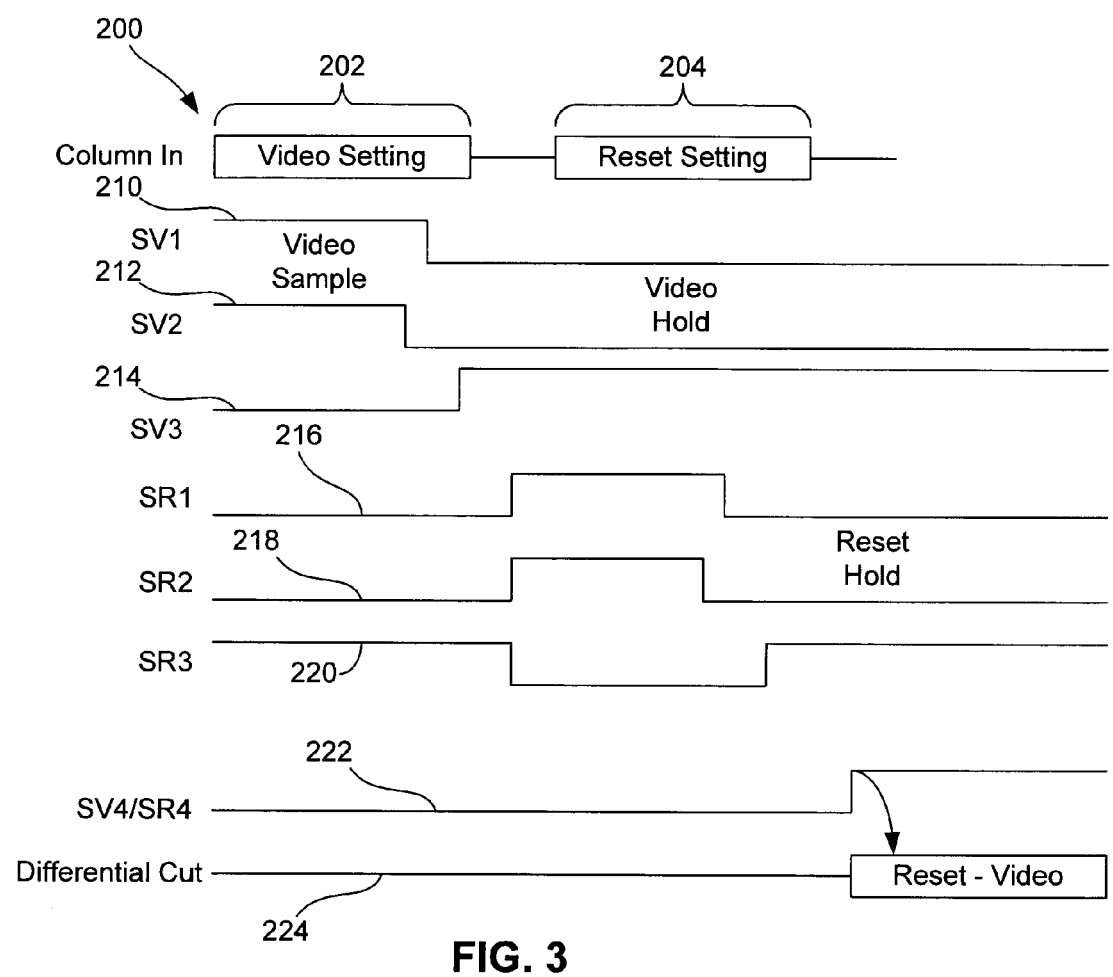
FIG. 3 illustrates a series of waveforms of control signals which may be utilized to advantage in the system of FIG. 1.

Since the operation of circuits 140 and 160 is identical, only the operation of the circuit 140 will be described in detail herein. Reference may be had to FIG. 3 during this description which shows various control signals for controlling the switches 150, 152, and 154.

When a video voltage is to be sampled and held, switch 150 starts out closed to input the pixel voltage. Switch 152 is also closed and switch 154 is opened. This may be seen from the control signals of FIG. 3 wherein control signal 210 which controls switch 150 is high, control signal 212 which controls switch 152 is high, and control signal 214 which controls switch 154 is low. When the control signals are high, their corresponding switches are closed, and when the control signals are low, the corresponding switches are open. Also at this time, switch 146 is open under control of control signal 222.

With switch 152 closed, the amplifier 142 is caused to be in unity gain feedback. Hence, there is no gain around the amplifier 142. The output is fed back to the input of amplifier 142 by switch 152 and remains at a constant common mode level.

When a pixel voltage is brought into the circuit 140, it appears at one of the plates of capacitor 148. Now, a charge is on capacitor 148 which is equal to the voltage difference across the capacitor. This voltage difference is the inputted pixel voltage on one side of the capacitor and the common mode level of the amplifier 142 on the other. That voltage, multiplied by the capacitance value of capacitor 148, is the charge across the capacitor. Hence, at this time, the video voltage has been sampled.

Next, as will be noted from control signal 212 going low, switch 152 opens to cause the input pixel voltage to be held. The charge on capacitor 148 cannot now be changed because there is no DC path for charge to leak on the amplifier side of capacitor 148.

Next, as may be seen from control signal 210 going low, switch 150 opens to disconnect the input node of capacitor 148 from the amplifier circuit. Now, both sides of capacitor 148 are floating so that again, no charge can be lost from the capacitor 148. At this point and time, the sampling and holding of the video voltage is complete. Now, as will be noted from control signal 214 going high, switch 154 closes completing the connection from the input side of capacitor 148 to the output 143 of amplifier 142. This causes the output 143 of the amplifier 142 to be identical to the voltage that was at the input node of capacitor 148 during the sampling period. Hence, the pixel voltage is now available at output 143 when the pixel voltage is to be read.

The foregoing procedure is repeated by circuit 160. This causes the reset voltage to be sampled and held.

When the pixel voltage and reset voltage of each pixel in a row of pixels have been sampled and held, they are now ready to be read in series, one at a time. During a reading of the video voltage of circuit 140 and reset voltage of circuit 160, as will be noted by the control signal 222 going high, switches 146 and 166 are closed to place the video voltage at input 50 of the differential amplifier 16 and the reset voltage at input 52 of the differential amplifier 16.

While particular objects and advantages of the present invention have been shown and described in the illustrated embodiments, modifications may be made. It is therefore intended in the appended claims to cover all such changes and modifications which fall within the true spirit and scope of the invention.

We claim:

1. An active pixel sensor array sampling system, comprising:
   at least one video circuit that generates a video voltage from each one of a group of pixels; and
   at least one reset circuit that generates a reset voltage associated with each one of the pixels in the group of pixels, wherein one or more of the video or reset circuits include:
   (1) an amplifier having an input and an output;
   (2) a column input having one of the video or reset voltage thereon; and
   (3) a single capacitor such that in a sampling-mode the single capacitor is coupled between the column input and the input of the amplifier, exclusive of any other capacitor coupled to the input of the amplifier, and in a readout-mode the single capacitor is coupled between the input of the amplifier and the output of the amplifier.

2. The system of claim 1 wherein the amplifier includes a single ended common source amplifier.

3. The system of claim 1 wherein the single capacitor holds the one of the video or reset voltage.

4. The system of claim 3 wherein the one or more of the video and reset circuits further include switches that place the single capacitor across the input and the output of the amplifier.

5. The system of claim 1 wherein the pixels are arranged in columns and rows, the at least one video circuit comprises a plurality of video amplifiers, each video amplifier being associated with a respective column of pixels, and wherein the at least one reset circuit comprises a plurality of reset amplifiers, each reset amplifier being associated with one of the video amplifiers.

6. The system of claim 1, further comprising:
a switch connecting the single capacitor to the column input in the sampling mode and disconnecting the single capacitor from the column input in the readout mode.

7. An active pixel sensor array sampling system comprising:
a video circuit that generates a video voltage from each one of a group of pixels; and
a reset circuit associated with the video circuit that generates a reset voltage associated with each one of the pixels in the group of pixels;
wherein the video and reset circuits each include (1) an amplifier having an input and an output, (2) a column input having one of the video or reset voltage thereon, and (3) a single capacitor selectively coupled between: (i) the column input and the input of the respective amplifier and (ii) the input of the respective amplifier and the output of the respective amplifier, when the single capacitor is coupled between the column input and the input of the respective amplifier, the single capacitor is coupled to the input of the respective amplifier exclusive of any other capacitor coupled thereto.

8. The system of claim 7 wherein the amplifier of each of the video and reset circuits comprises a single ended common source amplifier.

9. The system of claim 7 wherein the single capacitors of the video and reset circuits hold the video voltage and the reset voltage, respectively.

10. The system of claim 7 wherein the video and reset circuits include
a plurality of switches such that the plurality of switches are configured to place a respective single capacitor across the input and the output of the respective amplifier.

11. The system of claim 7 wherein the pixels are arranged in columns and rows and wherein the group of pixels is a column of pixels.

12. A video amplifier for use in sampling an active pixel sensor array, the video amplifier comprising:
a video circuit having:
(1) an amplifier with an input and an output,
(2) a column input having a video voltage thereon, and
(3) a single capacitor such that (i) in a sampling mode the capacitor is coupled between the column input and the input of the amplifier and (ii) in a readout mode the capacitor is coupled between the input of the amplifier and the output of the amplifier, when the single capacitor is coupled between the column input and the input of the amplifier, the single capacitor is coupled to the input of the respective amplifier exclusive of any other capacitor coupled thereto.

13. The video amplifier of claim 12, wherein the video circuit includes a closed loop sample and hold circuit, the amplifier of the video circuit including a single ended common source amplifier.

14. The video amplifier of claim 13, wherein the closed loop sample and hold circuit includes a plurality of switches configured to place the single capacitor across the input and output of the amplifier of the video circuit.

15. The video amplifier of claim 12, wherein the video circuit includes a video sample and hold circuit and the video sample and hold circuit includes the single capacitor.

16. The video amplifier of claim 12, further comprising:
a reset circuit having:
(1) a further amplifier with a further input and a further output; and
(2) a further single capacitor for holding a reset voltage thereon, the further single capacitor being coupled between the column input and the input of the further amplifier when the single capacitor of the video circuit is in the sampling mode and being coupled between the input and output of the further amplifier when the single capacitor of the video circuit is in the readout mode.

17. The video amplifier of claim 12, further comprising:
a switch connecting the single capacitor to the column input in the sampling mode and disconnecting the single capacitor from the column input in the readout mode.

18. An integrated circuit including a video amplifier for use in sampling an active pixel sensor array, the video amplifier comprising:
a video and reset circuit having:
(1) an amplifier with an input and an outputs,
(2) a column input having a video voltage thereon, and
(3) a single capacitor for holding the video voltage such that the capacitor is selectively switched between (i) the column input and the input of the amplifier in a sampling mode and (ii) the input of the amplifier and the output of the amplifier to transfer the video voltage in a readout mode, when the single capacitor is coupled between the column input and the input of the amplifier, the single capacitor is coupled to the input of the respective amplifier exclusive of any other capacitor coupled thereto.

19. The integrated circuit of claim 18, wherein the amplifier of the video and reset circuit comprises a single ended common source amplifier.

20. The integrated circuit of claim 18, wherein the video and reset circuit includes a plurality of switches configured to place the single capacitor either across the input and the output of the amplifier of the video and reset circuit in the readout mode or to place the capacitor across the column input and the input of the amplifier of the video and reset circuit in sampling mode.

21. The integrated circuit of claim 18 wherein the integrated circuit is a CMOS integrated circuit.

* * * * *

UNITED STATES PATENT AND TRADEMARK OFFICE
CERTIFICATE OF CORRECTION

PATENT NO. : 7,388,608 B2 Page 1 of 1
APPLICATION NO. : 10/798979
DATED : June 17, 2008
INVENTOR(S) : Beck et al.

It is certified that error appears in the above-identified patent and that said Letters Patent is hereby corrected as shown below:

In column 6, line 54, in Claim 20, after "in" insert -- the --.

Signed and Sealed this

Thirtieth Day of September, 2008

JON W. DUDAS
*Director of the United States Patent and Trademark Office*